(12) United States Patent
Oehler et al.

(10) Patent No.: US 7,921,188 B2
(45) Date of Patent: Apr. 5, 2011

(54) COMPUTER SYSTEM PARTITIONING USING DATA TRANSFER ROUTING MECHANISM

(75) Inventors: Richard R. Oehler, Somers, NY (US); William G. Kulpa, Lakeway, TX (US)

(73) Assignee: Newisys, Inc., San Jose, CA (US)

( * ) Notice: Subject to any disclaimer, the term of this patent is extended or adjusted under 35 U.S.C. 154(b) by 887 days.

(21) Appl. No.: 09/932,456

(22) Filed: Aug. 16, 2001

(65) Prior Publication Data
US 2003/0037224 A1  Feb. 20, 2003

(51) Int. Cl.
G06F 15/177 (2006.01)
G06F 15/16 (2006.01)
G06F 15/167 (2006.01)
G06F 15/00 (2006.01)

(52) U.S. Cl. ........ 709/220; 709/202; 709/212; 709/213; 712/1; 712/13

(58) Field of Classification Search .............. 712/1, 13; 709/201, 104, 105, 212, 213, 215, 216, 226, 709/235, 202, 220
See application file for complete search history.

(56) References Cited

U.S. PATENT DOCUMENTS

| | | | |
|---|---|---|---|
| 5,125,081 A | | 6/1992 | Chiba |
| 5,241,652 A | * | 8/1993 | Barabash et al. ............ 706/48 |
| 5,303,383 A | * | 4/1994 | Neches et al. ............ 712/43 |
| 5,506,840 A | * | 4/1996 | Pauwels et al. ............ 370/397 |
| 5,561,768 A | | 10/1996 | Smith ............ 395/200.1 |
| 5,640,327 A | * | 6/1997 | Ting ............ 716/7 |
| 5,721,819 A | * | 2/1998 | Galles et al. ............ 709/243 |
| 5,802,043 A | * | 9/1998 | Skillen et al. ............ 370/258 |
| 5,822,531 A | | 10/1998 | Gorczyca et al. |
| 5,959,995 A | | 9/1999 | Wicki et al. |
| 5,970,232 A | | 10/1999 | Passint et al. ............ 395/200.68 |
| 6,003,075 A | | 12/1999 | Arendt et al. |
| 6,167,492 A | | 12/2000 | Keller et al. ............ 711/154 |
| 6,188,759 B1 | | 2/2001 | Lorenzen et al. ............ 379/220 |
| 6,219,775 B1 | | 4/2001 | Wade et al. ............ 712/11 |
| 6,260,068 B1 | * | 7/2001 | Zalewski et al. ............ 709/226 |

(Continued)

FOREIGN PATENT DOCUMENTS
EP    0676703 A2    10/1995
(Continued)

OTHER PUBLICATIONS

*HyperTransport*™ I/O Link Specification Revision 1.03, HyperTransport™ Consortium, Oct. 10, 2001, Copyright © 2001 HyperTransport Technolgy Consortium.

(Continued)

Primary Examiner — Philip C Lee
(74) Attorney, Agent, or Firm — Weaver Austin Villeneuve and Sampson LLP (57) ABSTRACT

A computer system is described having a plurality of resources which includes a plurality of processors, a distributed point-to-point transmission infrastructure for interconnecting the plurality of processors, and a partitioning processor for configuring the plurality of resources into at least one partition. Each partition comprises a subset of the plurality of resources. The partitioning processor is operable to configure the resources by enabling at least one link between at least one of the plurality of processors and at least one other one of the plurality of processors according to a previously specified partitioning schema. The link(s) so enabled corresponds to a portion of the point-to-point transmission infrastructure.

37 Claims, 7 Drawing Sheets

U.S. PATENT DOCUMENTS

| | | | |
|---|---|---|---|
| 6,385,705 B1 | 5/2002 | Keller et al. | 711/154 |
| 6,490,661 B1 | 12/2002 | Keller et al. | 711/150 |
| 6,553,439 B1 | 4/2003 | Greger et al. | |
| 6,961,761 B2 * | 11/2005 | Masuyama et al. | 709/220 |
| 7,010,617 B2 | 3/2006 | Kampe et al. | |
| 7,043,569 B1 | 5/2006 | Chou et al. | |
| 2001/0037435 A1 | 11/2001 | Van Doren | 711/153 |
| 2002/0157035 A1 | 10/2002 | Wong et al. | |
| 2002/0174168 A1 | 11/2002 | Beukema et al. | |

FOREIGN PATENT DOCUMENTS

| | | |
|---|---|---|
| JP | 07-271698 | 10/1995 |
| JP | 2000-155697 | 6/2000 |
| JP | 2001-034587 | 2/2001 |

OTHER PUBLICATIONS

European Search Report Application No. 02759329.2-2211, dated Dec. 6, 2005.

Bossen et al., "Fault-tolerant design of the IBM pSeries 690 system using POWER4 processor technology." IBM J. Res. and Dev. vol. 46, No. 1, Jan. 2002.

JP Examination Report in corresponding JP Application No. 2003-521964 dated Oct. 2, 2007.

European Examination Report dated Jul. 2, 2007, from corresponding European Application No. 2759329.2 (6 pages).

Australian Examiner's Report dated Jul. 30, 2007, from corresponding Australian Application No. 2002324671 (2 pages).

Australia Office Action mailed Aug. 15, 2008 for application No. 2002324671.

European Examiner's Report mailed Feb. 5, 2010 for application No. 02759329.2.

Rugelj and Klavzar, "Distributed Multicast routing in point-to-point Networks", Jun. 1997.

Zheng and Shin, "On the Ability of Establishing Real-time Channels in Point-by-Point Packet-Switched Networks", Feb. 1994.

Japanese Decision of Rejection, dated Sep. 9, 2008, Application No. 2003-521964.

Japanese Examiner's Report dated Oct. 2, 2007, from corresponding Japanese Application No. 2003-521964 (4 pages).

* cited by examiner

COMPUTER SYSTEM PARTITIONING USING DATA TRANSFER ROUTING MECHANISM

BACKGROUND OF THE INVENTION

The present invention relates generally to the partitioning of resources in computer systems. More specifically, the present invention provides techniques for more precisely partitioning such resources than previously possible.

The basic idea of partitioning resources in distributed computing systems or even within the central electronic complex (CEC) of a single computer system is not new. However, some prior partitioning techniques have only been able to allocate system resources on a relatively coarse level, e.g., physically separate machines, groups of processors, etc., while others operate somewhat inflexibly, e.g., permanently assigning subsets of processors in a multi-processor group to a partition only upon system initialization.

Figure 1:
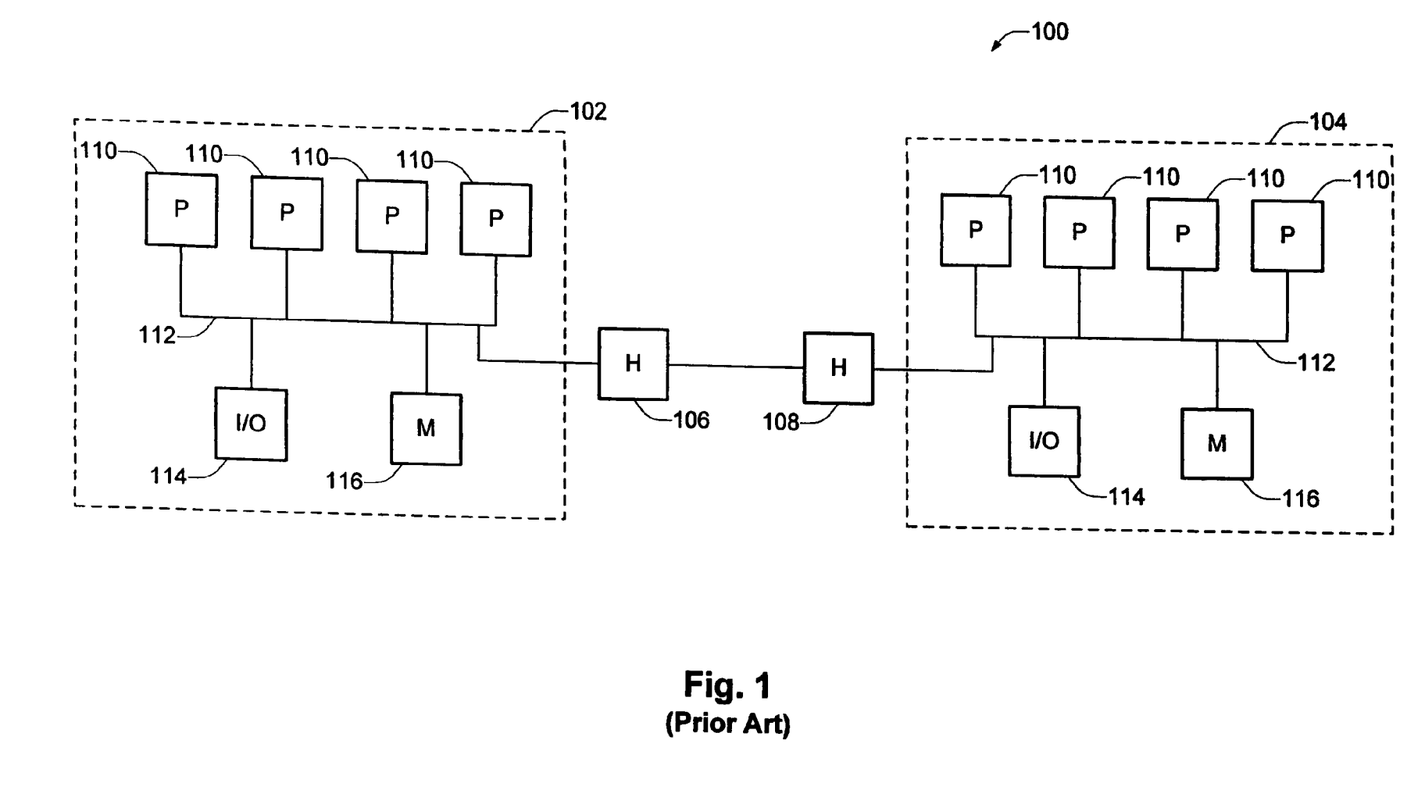
FIG. 1 is a block diagram of a conventional multi-processor system.

Some of the drawbacks of previous partitioning techniques may be understood with reference to FIG. 1 which depicts a conventional eight-processor system 100 with two four-processor groups (i.e., quads) 102 and 104 interconnected via hubs 106 and 108. Each of the processors 110 within a conventional quad is connected to a broadcast bus 112 which does not allow isolation of any one of the processors from any of the others, i.e., each request for access to a particular resource (e.g., I/O 114 or memory 116) by any of the processors is received by all of the other processors. Thus, because the only point-to-point communication that occurs in such a system is between the hubs connecting the two quads, the partitioning of such a system can only occur as between the hubs, i.e., one quad in one partition, the other quad in another.

A relatively new approach to the design of multi-processor systems replaces broadcast communication among processors with a point-to-point data transfer mechanism in which the processors communicate similarly to network nodes in a distributed computing system, e.g., a wide area network. That is, the processors are interconnected via a plurality of communication links and requests are transferred among the processors over the links according to routing tables associated with each processor. The intent is to increase the amount of information transmitted within a multi-processor platform per unit time. An example of this approach is the HyperTransport (HT) architecture recently announced by Advanced Micro Devices Inc. (AMD) of Sunnyvale, Calif., and described, for example, in a paper entitled *HyperTransport™ Technology: A High-Bandwidth, Low-Complexity Bus Architecture* delivered at WinHEC 2001, Mar. 26-28, 2001, at Anaheim, Calif., the entirety of which is incorporated herein by reference for all purposes. Operation of the AMD architecture will now be briefly described with reference to the simplified block diagram of FIG. 2.

Figure 2:
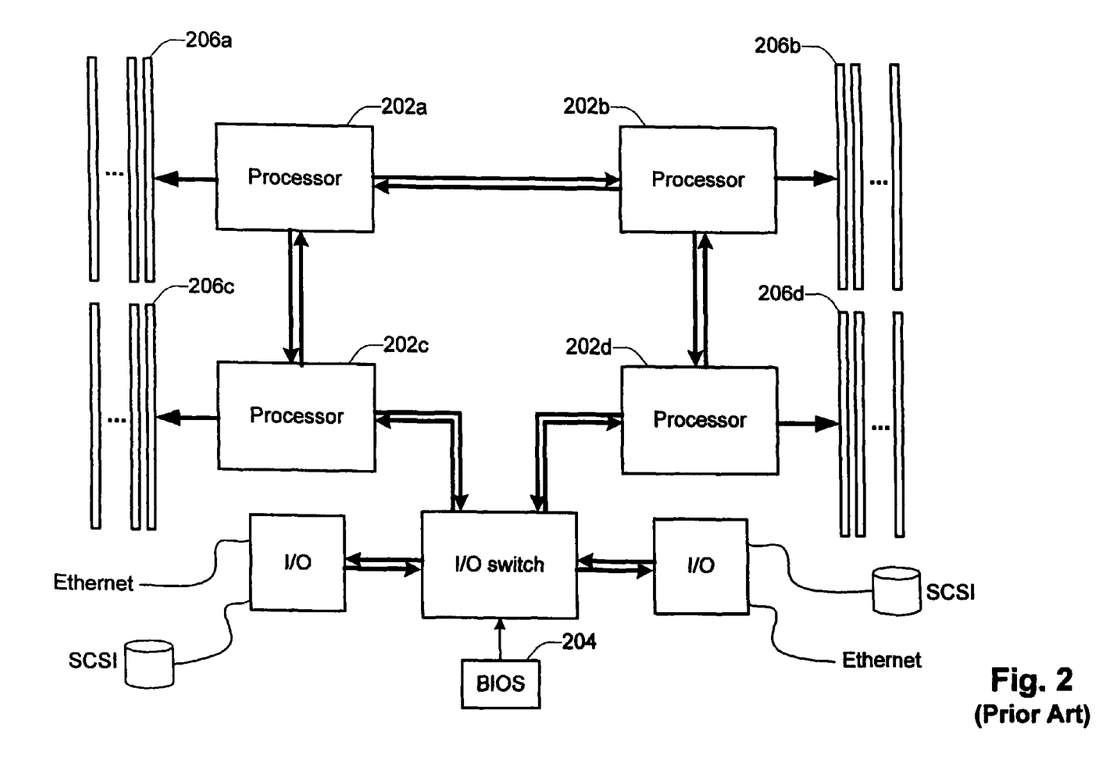
FIG. 2 is a block diagram of a multi-processor system having a point-to-point data transfer infrastructure.

Each time system 200 boots up, the routing tables associated with each of processors 202a-202d must be initialized. The primary processor 202a, i.e., the one communicating with BIOS 204, starts up while the remaining processors are not running and executes a "discovery" algorithm which builds up the routing tables in each of the processors using the HT infrastructure. This algorithm is a "greedy" algorithm which attempts to capture all of the available or "reachable" system resources and build a single, undivided system from the captured resources. Primary processor 202a begins this process by identifying all system resources which are responsive to it, i.e., all of the adjacencies. Then for each such resource (e.g., memory bank 206a and processors 202b and 202c), primary processor 202a requests all of the resources responsive to (i.e., "owned by") that resource (e.g., memory banks 206b and 206c). Using this information, the primary processor builds the routing tables. Unfortunately, the routing tables generated by such a system remain unchanged during system operation regardless of resource failures, load imbalances, or any other changes in conditions under which a reallocation of system resources would be desirable.

In view of the foregoing, it is desirable to provide techniques by which computer system resources may be more flexibly and precisely partitioned.

SUMMARY OF THE INVENTION

According to the present invention, the innovation represented by distributed point-to-point communication among processors in a single-platform, multi-processor system is leveraged to provide a greater level of flexibility and precision in the partitioning of computer system resources than ever before possible. That is, a distributed point-to-point communication infrastructure is employed to allow precise allocation of system resources through generation of routing tables according to a previously specified schema. According to various embodiments of the present invention, such partitioning may be done statically, e.g., at system start up, or dynamically, e.g., in response to some event, to achieve any desired allocation of system resources.

That is, the present invention provides a computer system having a plurality of resources which includes a plurality of processors, a distributed point-to-point transmission infrastructure for interconnecting the plurality of processors, and a partitioning processor for configuring the plurality of resources into one or more partitions. Each partition comprises a subset of the plurality of resources. The partitioning processor is operable to configure the resources by enabling at least one link between at least one of the plurality of processors and at least one other one of the plurality of processors according to a previously specified partitioning schema. The link(s) so enabled corresponds to a portion of the point-to-point transmission infrastructure. According to a specific embodiment of the invention, the enabling of the link(s) is effected by writing to at least one of a plurality of routing tables associated with the processors according to the previously specified partitioning schema.

Methods for partitioning such a computer system are also described. According to a specific embodiment, the plurality of resources are configured into one or more partitions. Each such partition comprises a subset of the plurality of resources. The configuring of the resources is effected by enabling at least one link between at least one of the plurality of processors and at least one other of the plurality of processors according to a previously specified partitioning schema. The at least one link so enabled corresponds to a portion of the point-to-point transmission infrastructure. According to a specific embodiment of the invention, the enabling of the at least one link is effected by writing to at least one of a plurality of routing tables associated with the processors according to the previously specified partitioning schema.

A further understanding of the nature and advantages of the present invention may be realized by reference to the remaining portions of the specification and the drawings.

DETAILED DESCRIPTION OF SPECIFIC EMBODIMENTS

A specific embodiment of the present invention will now be described with reference to a specific point-to-point communication infrastructure such as, for example, AMD's Hyper-Transport multi-processor architecture. It should be understood, however, that the scope of the invention is not limited to the particular embodiment described or the AMD architecture. That is, any multi-processor architecture having point-to-point communication among its processors and/or various other system resources is suitable for implementing specific embodiments of the present invention.

Figure 3:
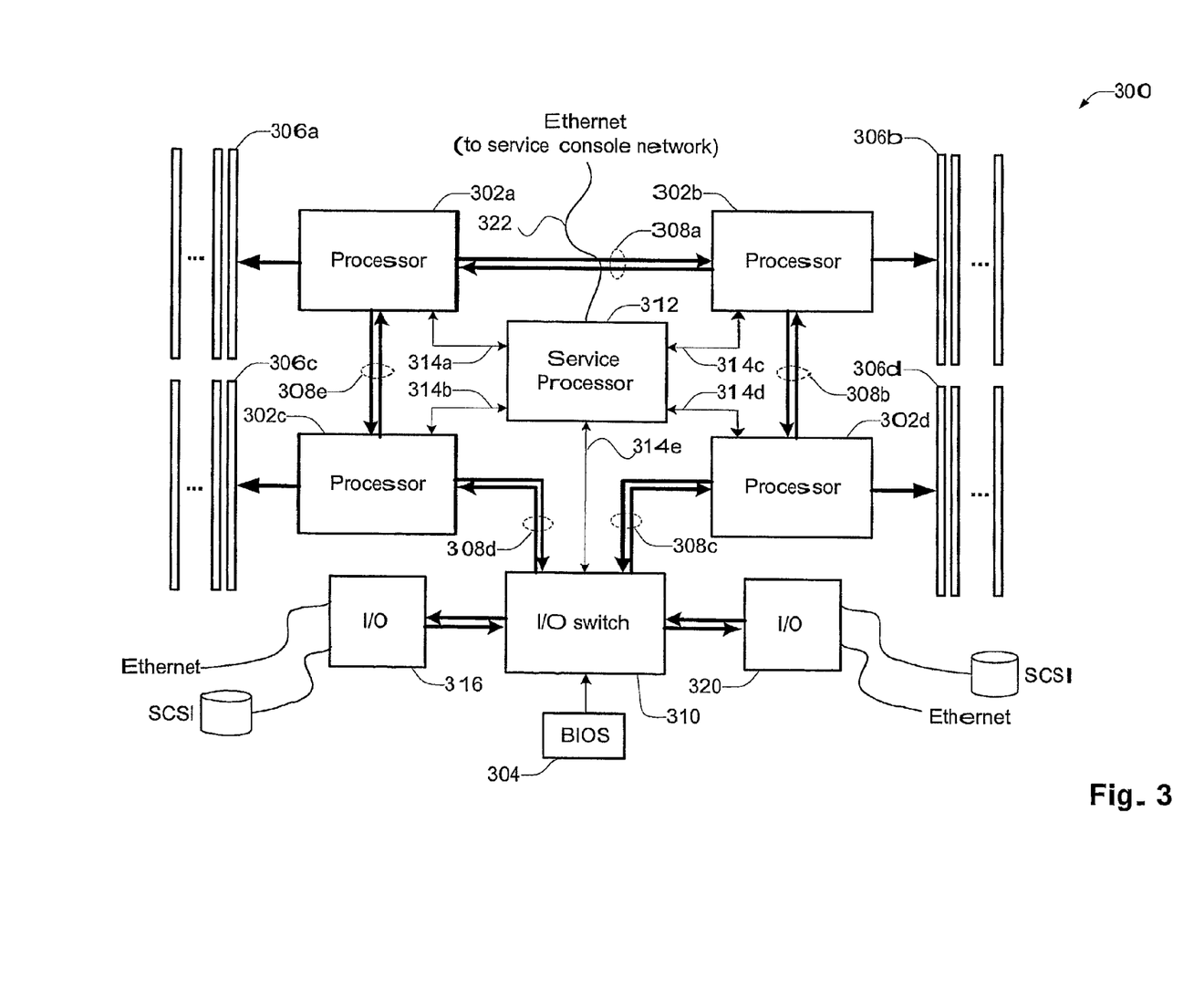
FIG. 3 is a block diagram of a portion of a multi-processor system which is designed and operates according to a specific embodiment of the present invention.

FIG. 3 shows a simplified block diagram of a server 300 designed in accordance with a specific embodiment of the present invention. Server 300 includes substantially identical processors 302a-302d, a Basic I/O system (BIOS) 304, a memory subsystem comprising memory banks 306a-306d, point-to-point communication links 308a-308e for interconnecting processors 302a-302d and I/O switch 310, and a service processor 312 which communicates with processors 302a-302d and I/O switch 310 via a JTAG interface represented in FIG. 3 by links 314a-314e. I/O switch 310 connects the rest of the system to I/O adapters 316 and 320.

According to specific embodiments, the service processor of the present invention has the intelligence to partition system resources according to a previously specified partitioning schema as opposed to the use of the "greedy" algorithm described above. This is achieved through direct manipulation of the routing tables associated with the system processors by the service processor which is made possible by the point-to-point communication infrastructure. The routing tables are used to control and isolate various system resources, the connections between which are defined therein.

According to a specific embodiment, the service processor is an autonomous processor with its own set of operating system applications (which is separate from the operating system(s) associated with the rest of the system) and its own I/O. It can run when the rest of the processors, memory, and I/O are not functioning. It operates as an external supervising intelligence which makes sure that all of the system resources are operating as desired.

It should be noted, however, that the previously specified partitioning schema need not be implemented by a separate service processor. That is, for example, one of the system processors could be employed for this purpose. According to such an embodiment, for example, the system BIOS could be altered to effect the schema using the system's primary processor.

In addition, according to various embodiments of the present invention, a partition may represent a variety of system resource combinations. That is, for example, in a "capacity on demand" scenario a partition could be represented by a single processor, removal of the processor from its partition rendering the remaining components unable to run an OS (and therefore the user would not be charged for this partition). A partition could also be represented by a processor and some associated memory or I/O. In general, any functional subset of the resources available in a computer system can be thought of as a partition.

More generally, it should be understood that the specific architecture shown in FIG. 3 is merely exemplary and that embodiments of the present invention are contemplated having different configurations and resource interconnections, and a variety of alternatives for each of the system resources shown. However, for purpose of illustration, specific details of server 300 will be assumed. For example, most of the resources shown in FIG. 3 are assumed to reside on a single electronic assembly. In addition, memory banks 306a-306d may comprise double data rate (DDR) memory which is physically provided as dual in-line memory modules (DIMMs). I/O adapter 316 may be, for example, an ultra direct memory access (UDMA) controller or a small computer system interface (SCSI) controller which provides access to a permanent storage device. I/O adapter 320 may be an Ethernet card adapted to provide communications with a network such as, for example, a local area network (LAN) or the Internet.

According to a specific embodiment and as shown in FIG. 3, both of I/O adapters 316 and 320 provide symmetric I/O access. That is, each provides access to equivalent sets of I/O. As will be understood, such a configuration would facilitate a partitioning scheme in which multiple partitions have access to the same types of I/O. It should also be understood, however, that embodiments are envisioned in which partitions without I/O are created. For example, a partition including one or more processors and associated memory resources, i.e., a memory complex, could be created for the purpose of testing the memory complex.

According to one embodiment, service processor 312 is a Motorola MPC855T microprocessor which is a PPC controller with integrated chipset functions.

Service processor 312 is primarily responsible for partitioning the resources of server 300. According to the embodiment shown in FIG. 3, service processor 312 allocates usage of processor 302a-302d and I/O switch 310 although it could be programmed to directly manage other resources such as, for example, memory banks or various I/O devices. Configuration of service processor 312 may be effected via a management/server console (not shown) to which service processor 312 is connected via communication link 322.

Figure 4:
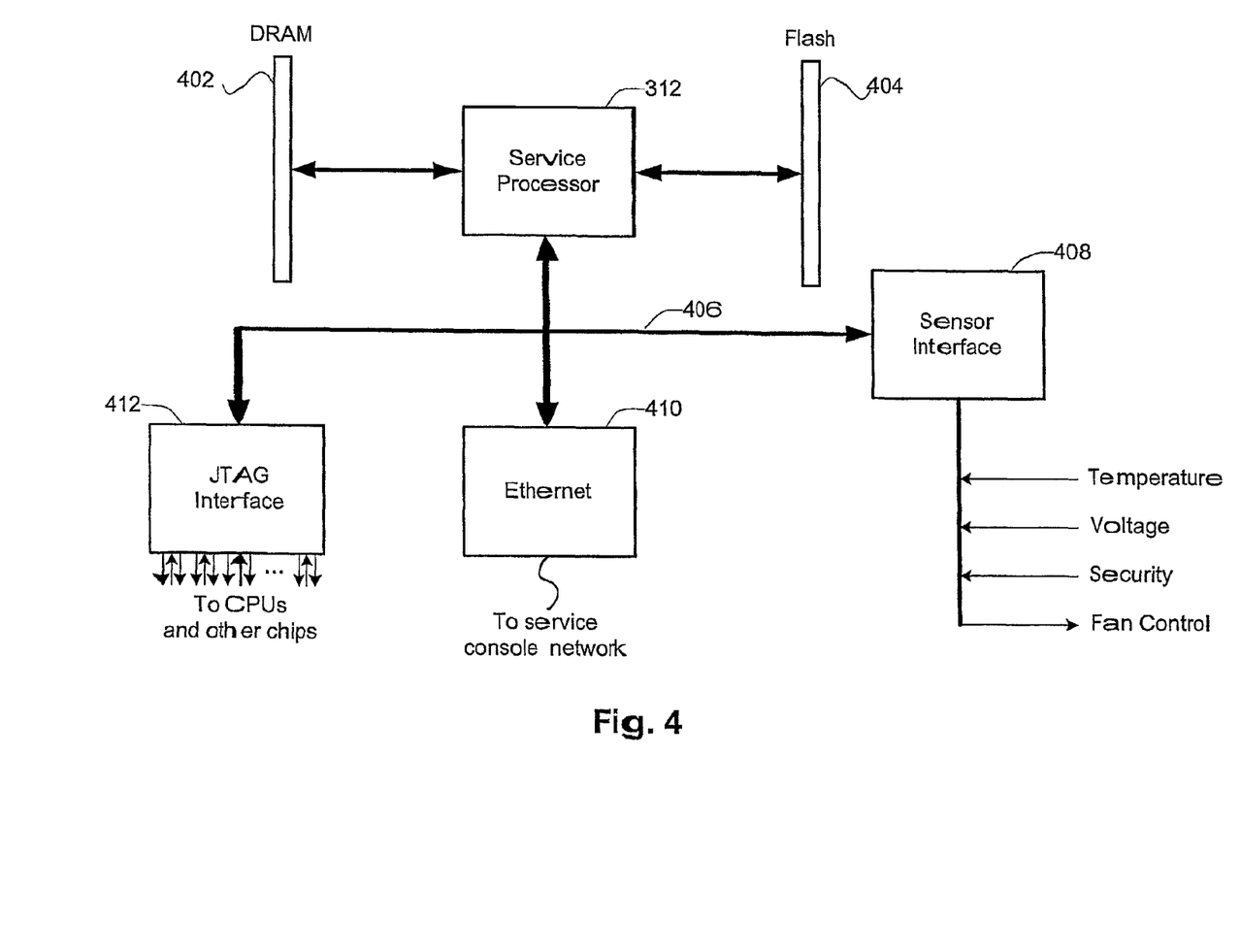
FIG. 4 is a block diagram of an exemplary mechanism for controlling partitioning of the multi-processor system of FIG. 3.
Figure 5:
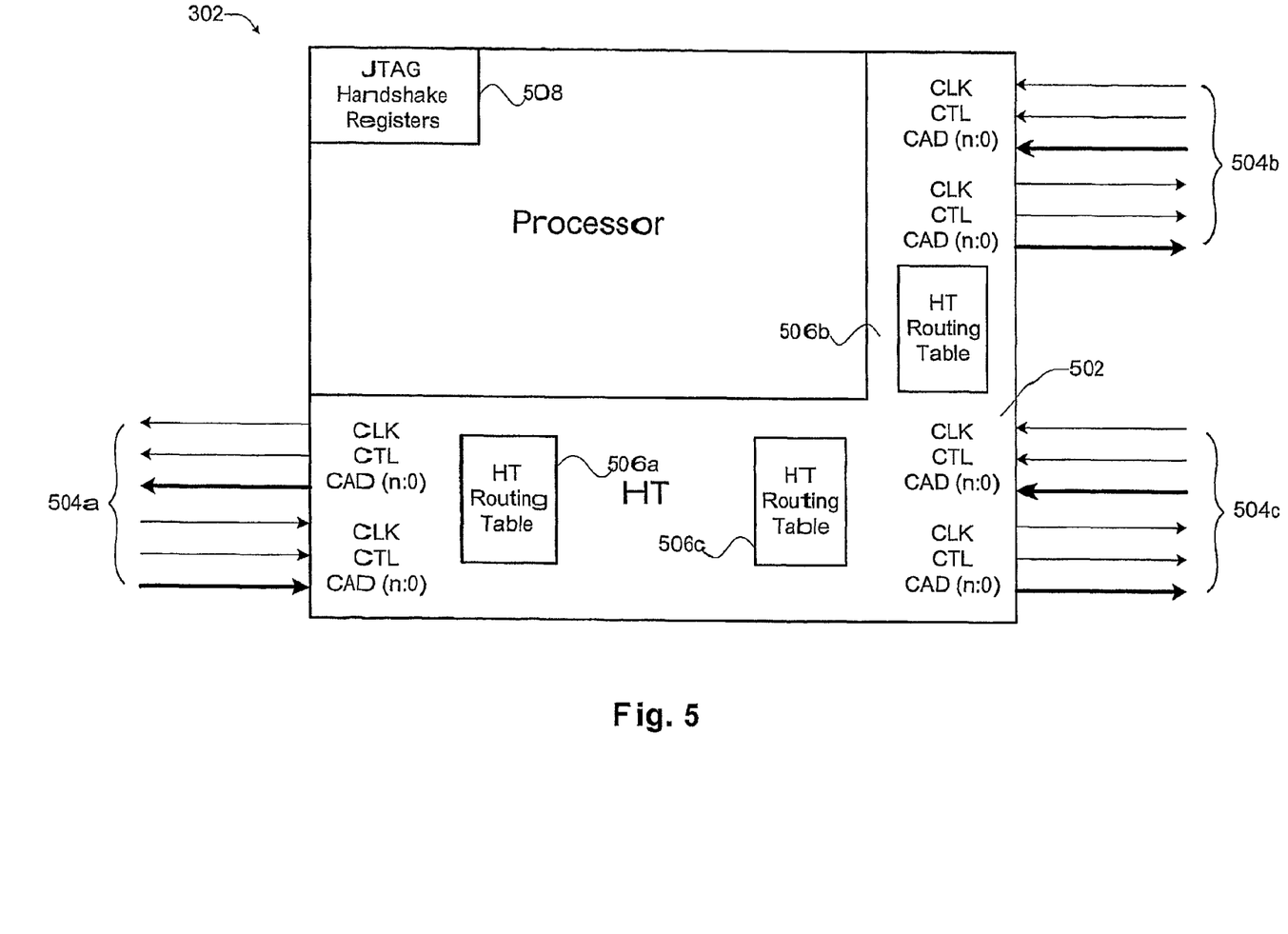
FIG. 5 is a block diagram of a processor for use with the present invention.

FIG. 4 is a high level block diagram of the interconnections for service processor 312 according to one implementation. It is important to note that the partitioning engine of the present invention could look very different from service processor 312 as depicted in FIGS. 3-5. That is, any mechanism which can intelligently reconfigure the routing tables using a point-to-point communication infrastructure is within the scope of the invention. For example, other possible mechanisms include using one or more of processors 302 to effect the partitioning.

In this embodiment, however, service processor 312 has direct connections to a DRAM storage block 402 and flash memory 404. DRAM 402 facilitates execution by the service processor of a program stored in flash 404. Service processor 312 is also connected via PCI bus 406 to a sensor interface 408, an Ethernet card 410, and a JTAG interface 412. Sensor interface 408 may include, for example, inputs from monitoring circuits (not shown) which provide indications of temperature, supply voltage, or security locks. Sensor interface

408 may also have various outputs such as, for example, a control signal for activating the system's fan. Ethernet card 410 provides an interface between service processor 312 and, for example, a service console by which the network administrator can monitor and configure the server.

According to a specific embodiment, interface 412 fully supports IEEE Standard 1149.1, commonly known as the Joint Test Action Group (JTAG) standard which describes the requirements for a test access port and boundary scan architecture. The test access port (TAP) comprises several pins including a test data in (TDI) pin, a test data out (TDO) pin, a test clock (TCK) pin, a test mode select (TMS) pin, and, optionally, a test reset (TRST) pin for driving the TAP controller to the test-logic-reset state. The TAP controller is a 16-state finite state machine that controls the boundary scan logic on the integrated circuit. As will be explained further below, JTAG interface 412 facilitates communication between service processor 312 and processors 302a-302d, thereby enabling both static and dynamic partitioning of the computer system's resources. According to a specific embodiment, this communication is facilitated using a simple outbound multiplexer.

Referring once again to FIG. 3 and according to a specific embodiment of the invention, processors 302a-302d may comprise AMD K8 processors which employ a point-to-point data transfer mechanism known as and referred to herein as the HT infrastructure. That is, the processors are interconnected via a plurality of point-to-point communication links (i.e., 308a-308e) and requests are transferred among the processors over the links according to routing tables associated with each processor. The HT infrastructure allows for the interconnection of a variety of computer resources such as, for example, peripheral component interconnect (PCI) devices, accelerated graphic port (AGP) devices, dynamic random access memory (DRAM) devices, and other dedicated, high-bandwidth buses in the computer system.

There are two forms of HT. The first form, non-coherent, or ncHT, was developed for I/O inks and is illustrated in FIG. 3 (308c and 308d). The coherent HT, or cHT, mechanism described herein has been developed by AMD for non-uniform memory access matrices in which arrays of processors can access local memory, i.e., memory connected to the processors in their cluster, as well as distant memory, i.e., memory connected to processors in remote clusters.

According to various embodiments of the invention, processors 302a-302d are substantially identical. FIG. 5 is a simplified block diagram of such a processor 302 which includes an HT interface 502 having a plurality of HT ports 504a-504c and routing tables 506a-506c associated therewith. Each HT port allows communication with other resources, e.g., processors or I/O devices, in the computer system via 16-bit HT links, e.g., links 308a-308e of FIG. 3.

The cHT infrastructure shown in FIG. 5 can be generalized as a point-to-point, distributed routing mechanism which comprises a plurality of segments interconnecting the systems processors (e.g., a goes-in-goes-out (GIGO) bus) according to any of a variety of topologies, e.g., ring, mesh, etc. Each of the endpoints of each of the segments is associated with a connected processor which has a unique node ID and a plurality of associated resources which it "owns," e.g., how much memory it's connected to, what I/O it's connected to, etc.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., if you want that address, go to node x; and if you want to go to node x use link y.

Associated with the routing tables are controls that are used when these tables are initialized or modified. These controls provide a means to atomically change values in the routing tables while the system continues to operate correctly.

As shown in FIG. 5, processor 302 can conduct point-to-point communication with three other processors according to the information in the associated routing tables. According to a specific embodiment, routing tables 506a-506c comprise two-level tables, a first level associating the unique addresses of system resources (e.g., a memory bank) with a corresponding HT node (e.g., one of the processors), and a second level associating each HT node with the link (e.g., 308a-308e) to be used to reach the node from the current node.

Processor 302 also has a set of JTAG handshake registers 508 which, among other things, facilitate communication between the service processor and processor 302. That is, the service processor writes routing table entries to handshake registers 508 for eventual storage in routing tables 506a-506c. It should be understood that the processor architecture depicted in FIG. 5 is merely exemplary for the purpose of describing a specific embodiment of the present invention. For example, a fewer or greater number of ports and/or routing tables may be used to implement other embodiments of the invention.

According to a specific embodiment, server 300 of FIG. 3 may be configured using the techniques described herein to operate as a single four-processor system, or as two or more functionally separate partitions. In contrast to the "greedy" algorithm contemplated by the designers of the HT infrastructure which operates without a priori knowledge of the eventual system configuration, service processor 312 facilitates the configuration of server 300 by generating and/or dynamically altering the routing tables associated with all or some of processors 302a-302d (and I/O switch 310) according to a previously specified partitioning schema. This is accomplished by service processor 312 writing routing table entries to the JTAG handshake registers of the appropriate processors (and similar tables associated with I/O switch 310) via interface links 314a-314e. As will be described, this system configuring/partitioning may be done either statically, e.g., at server boot up, or dynamically, e.g., during operation of server 300.

The present invention encompasses embodiments in which a computer system, e.g., a server, designed according to the invention is dynamically reconfigured (e.g., repartitioned). That is, the reconfiguration is accomplished without rebooting the system or re-initializing operation of the service processor, and occurs in response to some run-time event such as, for example, failure of a system resource.

In general, it should be understood that dynamic partitioning of system resources according to the invention may occur in response to a wide variety of run-time events. Specific examples of events or stimuli which can precipitate a dynamic partitioning include failure of a resource (e.g., a processor) associated with a currently existing partition, expiration of a predefined time interval (e.g., a maintenance period for a particular system resource), running of a particular application or combination of applications which alters the load distribution, and user instructions to reconfigure partitions.

Such user instructions may be, for example, for experimentation relating to load evaluation for various conditions, reallocation of resources for support of a particular application, reallocation of resources to handle known load variations over the course of a day, or reallocation of system resources in accordance with agreements with users or groups of users. Under the latter scenario, system users could be charged according to the resources that are allocated to them for their use, i.e., capacity on demand, but on a more granular resource level than ever before possible. This is because exploitation of a distributed point-to-point transmission infrastructure for interconnecting a plurality of processors, e.g., the HT infrastructure, allows allocation of, for example, a single processor, memory bank, or I/O bus.

A particular embodiment will now be described in which both static and dynamic system configuration/partitioning according to the techniques of the present invention are accomplished. As used herein, the term static partitioning refers to shutting down one or more operating systems associated with the computer system, performing the partitioning, and restarting one or more operating systems. By contrast, dynamic partitioning refers to working with one or more currently running operating systems to effect the partitioning.

For example, according to various embodiments of the invention, the service processor could make a request to remove resources from a currently existing partition, in response to which the affected operating system(s) would determine whether it could handle removal without shutting down. If so, the service processor is allowed to reconfigure the appropriate routing tables as described herein. If not, then any partitioning must be done statically.

If, on the other hand, a request to add available resources to a currently existing partition, the service processor makes a call to the affected operating system(s) to add the resources. The affected operating system(s) might then be able to add the resources without stopping operation.

Figure 6:
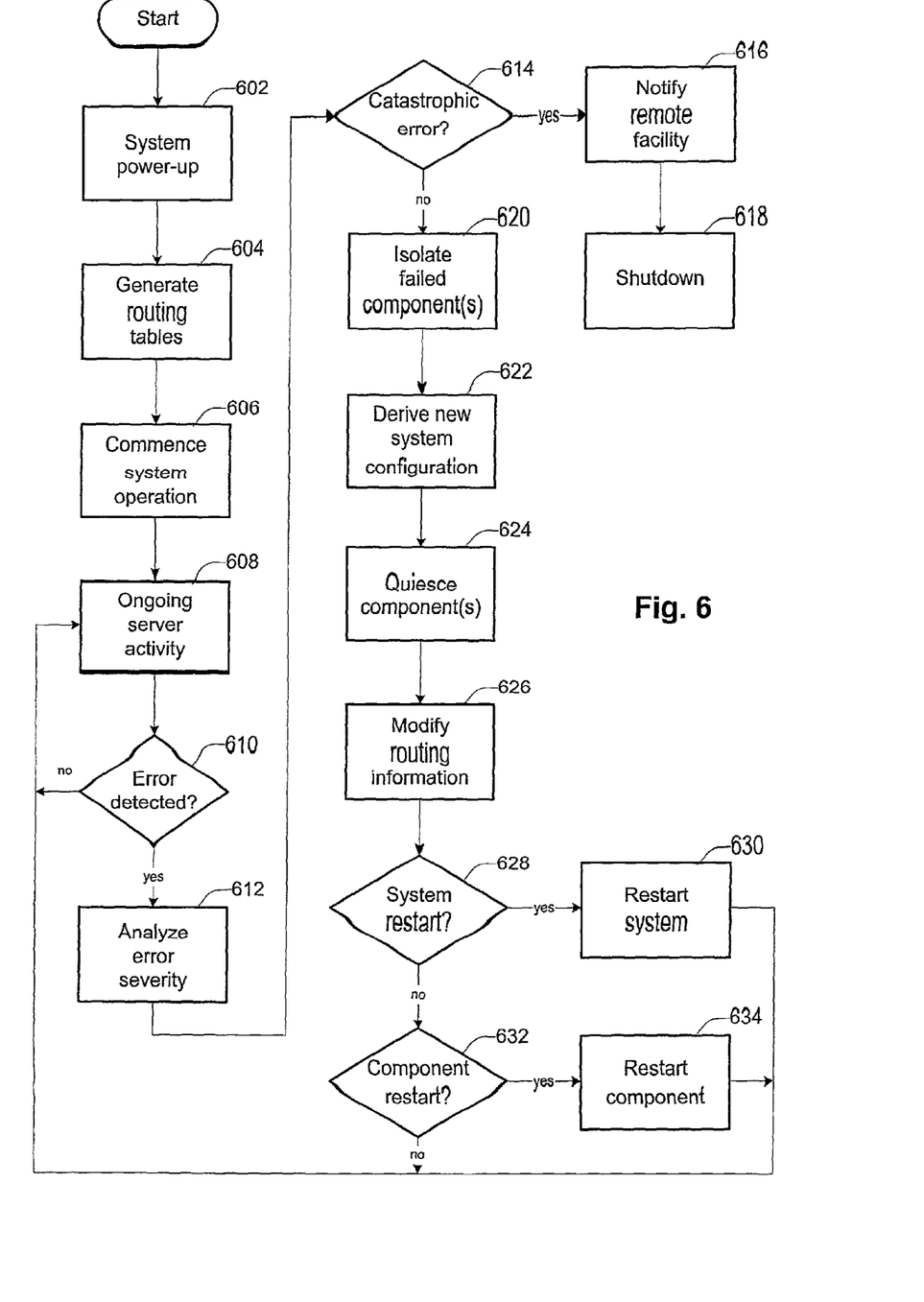
FIG. 6 is a flowchart illustrating a specific embodiment of the present invention.

Referring now to FIG. 6, when power is applied to the system (602), the service processor initializes each of the system processors by generating their associated routing tables according to a previously specified configuration (604), i.e., a static partitioning is performed. The initial system configuration may be stored, for example, in flash memory to which the service processor is connected, or specified by the system administrator bringing the system on line. The system configuration may correspond to one or more functionally separate partitions to effect a wide variety of operational goals. Once the routing tables have been generated, system operation begins in which the system resources are allocated to the one or more functionally separate partitions (606).

The service processor then continues to monitor ongoing server activity for the occurrence of a run-time event which requires repartitioning of the system (608). As described above, the present invention contemplates a wide variety of such run-time events as being suitable for stimulating dynamic partitioning. However, for the purposes of illustration, the failure of a system resource will be used in this exemplary embodiment. Thus, in 608 the service processor looks for system error messages relating to such failures. If such an error message is detected (610), the message is analyzed to determine the severity of the error (612). If the error is catastrophic (614), i.e., the system will be unable to operate reliably, then a remote facility is notified (616), and the system is shut down (618).

If, on the other hand, the error is not catastrophic (614), the failed component(s) are isolated (620) and a new system configuration is derived (622) in which the failed component(s) is (are) excluded from any of the resulting functional partitions. According to some embodiments, the derivation of the new system configuration is done with reference to the current system configuration, e.g., the configuration stored in flash memory associated with the service processor, and the failure information. The service processor then effects the new partitioning scheme by quiescing the appropriate system resources (624) and making the appropriate modifications to the routing tables and controls associated with the system nodes, e.g., the processors (626).

According to a specific embodiment of the present invention, the service processor is configured to automatically quiesce any failed processor and thereby remove it from the available processor pool. The corresponding command may be sent from the service processor to the operating system using the Advanced Configuration and Power Interface (ACPI) 2.0 protocol. Threads already assigned to the failed processor are completed (if possible) and, once the operating system has quiesced, an acknowledgement is sent to the service processor which then removes the failed processor from its partition. The service processor may assign another one of the processors to the failed processor's partition, leave the partition in its reduced state, or eliminate the partition altogether.

After the failed component(s) has (have) been isolated and any repartitioning defined, a determination is made as to whether it is necessary to restart the system in order to properly initialize the newly formed partitions (628). If so, a system restart is initiated (630). If not, a further determination is made as to whether any specific system components require initialization without necessitating a system-wide reboot (632). If so, a power-on reset signal is sent to the identified component(s) (634). Otherwise, the server is then allowed to continue normal operation. Alternatively, given that failures of system resources often result in the necessity for a system restart, embodiments are contemplated in which a system restart would automatically occur after a system is repartitioned in response to such a failure.

It will be understood with reference to the foregoing that the techniques of the present invention may be employed to deal with power-on failures of a central processing unit (CPU) in a system in which system initialization is directed by one of the system processors rather than the service processor. Because, according to particular embodiments, the service processor of the present invention communicates "out-of-band" with the system processors to configure their routing tables, a computer system can be made more robust in the face of the failure of a partition when the primary system processor goes bad and cannot complete the initialization chain with the secondary system processor(s), i.e., "in-band" communication. In such an instance, when the service processor detects that the primary processor has failed (either from an active failure signal or lack of any signal) then the routing tables and controls of the secondary system processor(s) can be modified directly by the service processor to exclude the failed processor, designate a new primary system processor, and complete the stalled initialization.

As mentioned above, the present invention contemplates a variety of mechanisms by which dynamic repartitioning of the resources of a computer system may be initiated. One such mechanism, a run-time partitioning request entered by a system administrator, will now be described with reference to the flowchart of FIG. 7. The embodiment shown begins with the monitoring of ongoing server activity for partitioning requests from, for example, a system management console (702). If such a request is received (704), the service processor determines whether the request is valid (706). According to various specific embodiments of the present invention, the validity of a partitioning request may be determined according to any of a variety of criteria. For example, the partitions indicated by the request could be checked against a minimum resource list for a valid partition. If the request is determined not to be valid (706), a response is sent to the console indicating that the request is invalid and denied (708). According to various embodiments, the response could indicate additional information as to why the request is invalid, e.g., the request tried to create a partition which contains no boot image.

Figure 7:
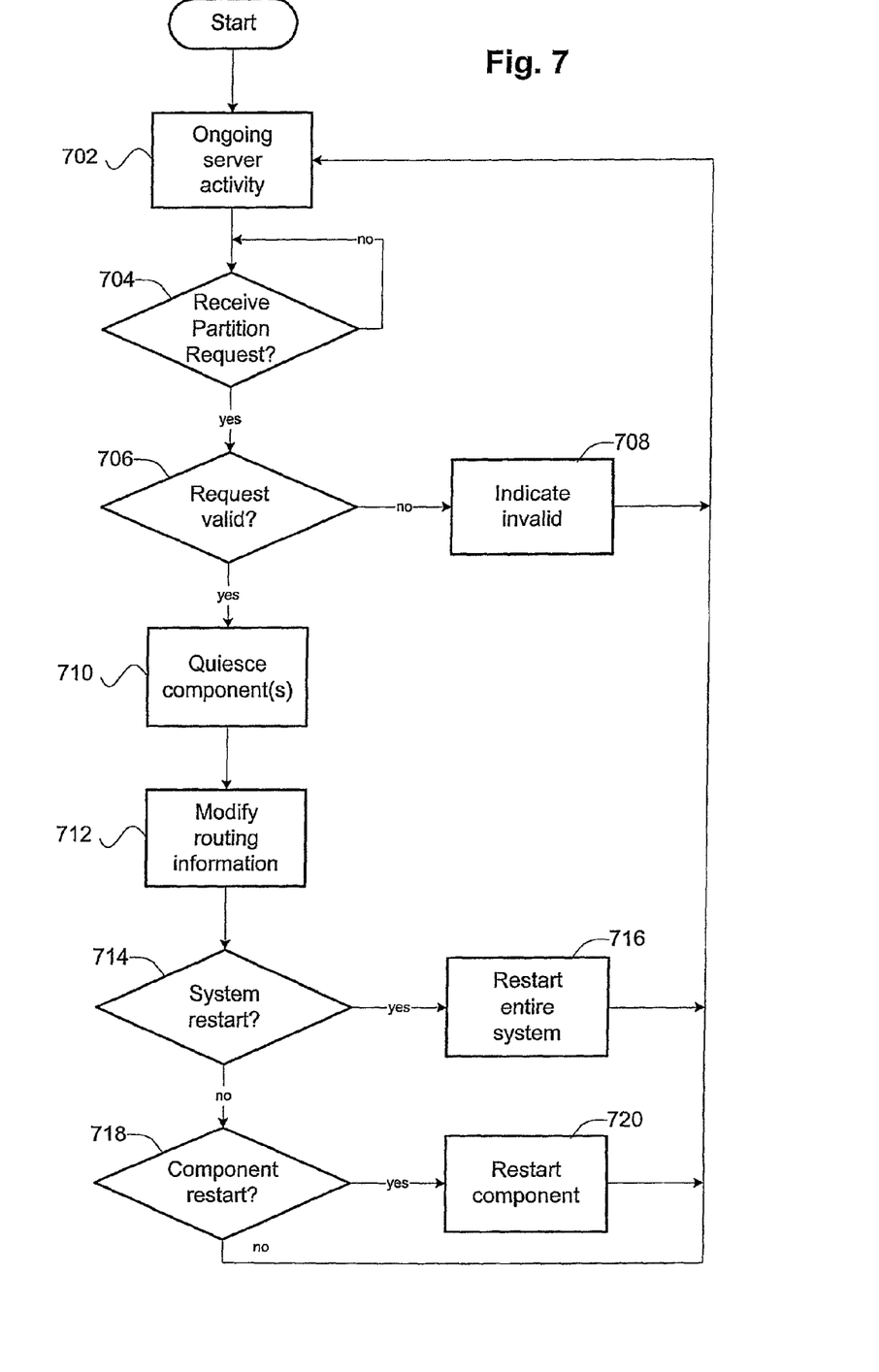
FIG. 7 is a flowchart illustrating another specific embodiment of the present invention.

If, on the other hand, the partitioning request is determined to be valid (706), the service processor effects the requested partitioning scheme by quiescing the appropriate system resources (e.g., processors, memory, I/O) to effect the new partitions (710), and making the appropriate modifications to the routing tables associated with the quiesced system resources (712).

After the system partitioning has been redefined, a determination is made as to whether it is necessary to restart the entire system for the proper initialization of the newly formed partitions (714). If so, the system is restarted (716). If not, a further determination is made as to whether any specific system component(s) requires initialization (718). If so, then a power-on reset signal is sent to such component(s) (720). After repartitioning is complete, the monitoring of ongoing server activity resumes (702). Thus, the present invention makes it possible to repartition a server (or any computing system) during run-time.

More generally and as discussed above, such repartitioning can result from a wide variety of run-time events and for a wide variety of purposes. For example, instead of responding to a request from the system administrator, a repartitioning of system resources could occur in response to a particular combination of applications being run. That is, the system may be initially partitioned to run a first combination of applications each of which requires a certain level of resources. When a second combination of applications are to be run requiring a different allocation of system resources, an automatic repartitioning of the system to effect the new allocation of resources may occur.

While the invention has been particularly shown and described with reference to specific embodiments thereof, it will be understood by those skilled in the art that changes in the form and details of the disclosed embodiments may be made without departing from the spirit or scope of the invention. For example, the present invention may be generalized from the embodiments described to implementations having any number of processors.

Moreover, the techniques of the present invention do not necessarily require a separate service processor to effect the static and dynamic partitioning described herein. That is, one of the system's processor could be configured to perform these functions either at system start up or in response to a run-time event. Embodiments are also contemplated in which multiple processors are configured to cooperatively perform the partitioning. The program for directing these types of operation could be stored in, for example, the system BIOS memory.

In addition, although a specific embodiment is described herein in which the techniques of the present invention are employed both at system initialization and during system operation, it will be understood that the present invention encompasses embodiments in which the techniques enabled by the invention are employed only at one or the other. That is, embodiments in which the invention is only used to initialize a system are contemplated. Conversely, embodiments in which only dynamic partitioning is effected are also contemplated.

It should also be understood that the term "resource" as used herein is contemplated to include far more than the physical implementation of a single microprocessor. That is, according to various embodiments of the invention, a resource can be thought of as any of the major elements of a computing system. Such elements may include physical elements such as one or more processors, banks of memory (typically physical memory, e.g., banks of DIMMs), I/O buses (e.g., PCI or ISA buses), and elements on a bus (e.g., SCSI card, a communication card, Fibre Channel card) to name a few. However, it should also be noted that system resources can be logical elements such as the logical components associated with a processor (e.g., a DMA engine or an interrupt mechanism for routing interrupts).

It is also important to note that the present invention should not be limited to embodiments in which routing tables are manipulated to effect a partitioning scheme. That is, the present invention can be thought of as encompassing computer systems and methods of partitioning in which the partitioning is effected by the enabling and disabling of links between the systems processors, the links representing portions of the distributed point-to-point transmission infrastructure by the processors are interconnected. For example, an alternative way to enable and disable these links would be by opening and closing switches.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system, comprising:
a plurality of resources including a plurality of processors;
a distributed point-to-point transmission infrastructure for interconnecting the plurality of processors; and
at least one partitioning processor for configuring the plurality of resources into a plurality of partitions, each partition comprising a subset of the plurality of resources and a portion of the point-to-point transmission infrastructure, the portion of the point-to-point transmission infrastructure in each partition being distinct from and non-overlapping with the portion of the point-to-point transmission infrastructure in each other partition, the at least one partitioning processor being operable to configure the resources by writing to at least one of a plurality of routing tables associated with the processors according to a previously specified partitioning schema, each routing table representing dedicated physical links between an associated processor and other ones of the plurality of processors, the links corresponding to portions of the point-to-point transmission infrastructure.

2. The computer system of claim 1 wherein the plurality of resources further includes at least one of a memory device, a memory range, an I/O bus, I/O devices coupled to an I/O bus, and an interrupt mechanism for routing interrupts.

3. The computer system of claim 1 wherein the plurality of resources includes an I/O switch, the I/O switch having one of the routing tables associated therewith representing links between the I/O switch, at least one of the processors, and at least one I/O resource.

4. The computer system of claim 3 wherein the at least one I/O resource comprises at least one of an Ethernet device and a SCSI device.

5. The computer system of claim 1 wherein each routing table comprises a table of entries, each of selected ones of the entries associating an address of one of the resources with one of the processors and a link for connecting with the one of the processors.

6. The computer system of claim 1 wherein the distributed point-to-point transmission infrastructure comprises a coherent HyperTransport (cHT) infrastructure.

7. The computer system of claim 1 wherein the distributed point-to-point transmission infrastructure interconnects the processors using a ring topology.

8. The computer system of claim 1 wherein the distributed point-to-point transmission infrastructure interconnects the processors using a mesh topology.

9. The computer system of claim 1 wherein the distributed point-to-point transmission infrastructure directly connects each of the processors with every other one of the processors.

10. The computer system of claim 1 wherein the at least one partitioning processor comprises at least one of the plurality of processors interconnected by the distributed point-to-point transmission infrastructure.

11. The computer system of claim 1 wherein the at least one partitioning processor is separate from the plurality of processors interconnected by the distributed point-to-point transmission infrastructure.

12. The computer system of claim 11 further comprising a boot memory for facilitating initialization of the computer system, the boot memory having computer program instructions stored therein for facilitating operation of at least one of the plurality of processors as the at least one partitioning processor.

13. The computer system of claim 1 wherein the previously specified partitioning schema is generated in response to an event occurring during operation of the computer system.

14. The computer system of claim 13 wherein the event comprises one of initialization of the computer system, a failure of at least one of the resources, a change in operating load associated with at least one of the resources, passage of a period of time, use of particular software, and a change in available power resources.

15. The computer system of claim 1 further comprising at least one partitioning processor link for connecting the at least one partitioning processor with a user interface, and wherein the previously specified partitioning schema is specified by a user of the computer system via the user interface and the at least one partitioning processor link.

16. The computer system of claim 1 wherein the at least one partitioning processor is operable to generate the routing tables upon initialization of the computer system.

17. The computer system of claim 1 wherein the at least one partitioning processor is operable to alter the at least one of the routing tables during operation of the computer system.

18. The computer system of claim 1 wherein at least one of the plurality of partitions comprising a functional subset of the plurality of resources.

19. The computer system of claim 1 wherein the at least one partitioning processor comprises one partitioning processor.

20. The computer system of claim 1 wherein the at least one partitioning processor comprises more than one partitioning processor.

21. A computer implemented method for use in a computer system having a plurality of resources including a plurality of processors and a distributed point-to-point transmission infrastructure for interconnecting the plurality of processors, the method comprising configuring the plurality of resources into a plurality of partitions, each partition comprising a subset of the plurality of resources and a portion of the point-to-point transmission infrastructure, the portion of the point-to-point transmission infrastructure in each partition being distinct from and non-overlapping with the portion of the point-to-point transmission infrastructure in each other partition, the configuring of the resources being effected by writing to at least one of a plurality of routing tables associated with the processors according to a previously specified partitioning schema, each routing table representing dedicated physical links between an associated processor and other ones of the plurality of processors, the links corresponding to portions of the point-to-point transmission infrastructure.

22. The method of claim 21 wherein the plurality of resources includes an I/O switch, the I/O switch having one of the routing tables associated therewith representing links between the I/O switch, at least one of the processors, and at least one I/O resource.

23. The method of claim 22 wherein the distributed point-to-point transmission infrastructure comprises a non-coherent HyperTransport (ncHT) infrastructure.

24. The method of claim 21 wherein configuring the plurality of resources is achieved using at least one partitioning processor which comprises at least one of the plurality of processors interconnected by the distributed point-to-point transmission infrastructure.

25. The method of claim 21 wherein configuring the plurality of resources is achieved using at least one partitioning processor which is separate from the plurality of processors interconnected by the distributed point-to-point transmission infrastructure.

26. The method of claim 21 further comprising generating the previously specified partitioning schema in response to an event occurring during operation of the computer system.

27. The method of claim 26 wherein the event comprises one of initialization of the computer system, a failure of at least one of the resources, a change in operating load associated with at least one of the resources, passage of a period of time, use of particular software, and a change in available power resources.

28. The method of claim 21 further comprising receiving the previously specified partitioning schema as specified by a user of the computer system.

29. The method of claim 21 wherein writing to the at least one of the plurality of routing tables comprises generating the plurality of routing tables upon initialization of the computer system.

30. The method of claim 21 wherein writing to the at least one of the plurality of routing tables comprises altering the at least one of the routing tables during operation of the computer system.

31. The method of claim 21 wherein at least one of the plurality of partitions comprising a functional subset of the plurality of resources.

32. A computer system, comprising:
a plurality of resources including a plurality of processors;
a distributed point-to-point transmission infrastructure for interconnecting the plurality of processors; and
at least one partitioning processor for configuring the plurality of resources into a plurality of partitions, each partition comprising a subset of the plurality of resources and a portion of the point-to-point transmission infrastructure, the portion of the point-to-point transmission infrastructure in each partition being distinct from and non-overlapping with the portion of the point-to-point transmission infrastructure in each other partition, the at least one partitioning processor being operable to configure the resources by enabling operation of at least one dedicated physical link between at least one of the plurality of processors and at least one other one of the plurality of processors according to a previously specified partitioning schema, the at least one link corresponding to a portion of the point-to-point transmission infrastructure.

33. The computer system of claim 32 wherein enabling operation of the at least one link comprises writing to at least one of a plurality of routing tables associated with the processors according to the previously specified partitioning schema.

34. The computer system of claim 32 wherein enabling operation of the at least one link comprises closing at least one switch associated with the at least one link according to the previously specified partitioning schema.

35. A computer implemented method for use in a computer system having a plurality of resources including a plurality of processors and a distributed point-to-point transmission infrastructure for interconnecting the plurality of processors, the method comprising configuring the plurality of resources into a plurality of partitions, each partition comprising a subset of the plurality of resources and a portion of the point-to-point transmission infrastructure, the portion of the point-to-point transmission infrastructure in each partition being distinct from and non-overlapping with the portion of the point-to-point transmission infrastructure in each other partition, the configuring of the resources being effected by enabling operation of at least one dedicated physical link between at least one of the plurality of processors and at least one other one of the plurality of processors according to a previously specified partitioning schema, the at least one link corresponding to a portion of the point-to-point transmission infrastructure.

36. The method of claim 35 wherein enabling operation of the at least one link comprises writing to at least one of a plurality of routing tables associated with the processors according to the previously specified partitioning schema.

37. The method of claim 35 wherein enabling operation of the at least one link comprises closing at least one switch associated with the at least one link according to the previously specified partitioning schema.

* * * * *